US008517835B2

(12) United States Patent
Dwyer et al.

(10) Patent No.: US 8,517,835 B2
(45) Date of Patent: Aug. 27, 2013

(54) VIDEO GAME AND PERIPHERAL FOR SAME

(75) Inventors: Patrick Dwyer, Chicago, IL (US); Nick Ehrlich, Chicago, IL (US); Matt Knowles, Chicago, IL (US); Scott Krager, Santa Monica, CA (US); Arnab Sen, Santa Monica, CA (US); David M. Tibbetts, Chicago, IL (US); Joshua Tsui, Chicago, IL (US); Peter J. Sauerbrei, Chicago, IL (US)

(73) Assignee: Activision Publishing, Inc., Santa Monica, CA (US)

( * ) Notice: Subject to any disclaimer, the term of this patent is extended or adjusted under 35 U.S.C. 154(b) by 467 days.

(21) Appl. No.: 12/390,402

(22) Filed: Feb. 20, 2009

(65) Prior Publication Data
US 2010/0216551 A1    Aug. 26, 2010

(51) Int. Cl.
*A63F 11/00* (2006.01)
*A63F 9/00* (2006.01)

(52) U.S. Cl.
USPC .... 463/36; 436/1; 436/7; 436/37; 273/148 R; 273/148 B (58) Field of Classification Search
USPC ............................. 463/1, 7, 36–39, 40–42, 47
See application file for complete search history.

(56) References Cited

U.S. PATENT DOCUMENTS

| 4,817,950 A | 4/1989 | Goo |
| 4,906,192 A | 3/1990 | Smithard et al. |
| 4,925,189 A | 5/1990 | Braeunig |
| 4,966,364 A | 10/1990 | Eggenberger |
| 5,049,079 A | 9/1991 | Furtado et al. |
| 5,059,958 A | 10/1991 | Jacobs et al. |
| 5,139,261 A * | 8/1992 | Openiano ................. 463/36 |
| 5,181,181 A | 1/1993 | Glynn |
| 5,252,068 A | 10/1993 | Gryder |
| 5,329,276 A | 7/1994 | Hirabayashi |
| 5,405,152 A | 4/1995 | Katanics et al. |
| 5,409,226 A | 4/1995 | Mesko et al. |
| 5,516,105 A | 5/1996 | Eisenbrey et al. |
| 5,547,382 A | 8/1996 | Yamasaki et al. |
| 5,602,569 A | 2/1997 | Kato |
| 5,615,132 A | 3/1997 | Horton et al. |
| 5,713,794 A | 2/1998 | Shimojima et al. |
| 5,774,113 A * | 6/1998 | Barnes ..................... 156/156 |

(Continued)

OTHER PUBLICATIONS

International Search Report on corresponding PCT application (PCT/US2010/024873) from International Searching Authority (KR) dated Oct. 15, 2010.

(Continued)

*Primary Examiner* — Dmitry Suhol
*Assistant Examiner* — Alex F. R. P. Rada, II
(74) *Attorney, Agent, or Firm* — Klein, O'Neill & Singh, LLP (57) ABSTRACT

A video game controller with a position sensor and a proximity sensor provides user input signals for use in determining game states. The video game controller can have a board or deck like surface similar to that of a skateboard, and the proximity sensor can be used to determine if a grab of the board has been attempted. A video game associated with the video game controller can provide a skateboard or other game in which a skateboard and skateboarding character are responsive to a game player's manipulation of the video game controller.

17 Claims, 9 Drawing Sheets

(56) References Cited

U.S. PATENT DOCUMENTS

| | | | |
|---|---|---|---|
| 5,813,864 A | 9/1998 | Ikuta | |
| 5,819,206 A | 10/1998 | Horton et al. | |
| 5,860,861 A * | 1/1999 | Lipps et al. | 463/36 |
| 5,913,727 A | 6/1999 | Ahdoot | |
| 6,022,272 A | 2/2000 | Sano | |
| 6,028,593 A | 2/2000 | Rosenberg et al. | |
| 6,137,468 A | 10/2000 | Martinez et al. | |
| 6,139,473 A | 10/2000 | Koyama et al. | |
| 6,142,870 A | 11/2000 | Wada et al. | |
| 6,225,977 B1 * | 5/2001 | Li | 345/156 |
| 6,270,403 B1 | 8/2001 | Watanabe et al. | |
| 6,368,217 B2 | 4/2002 | Kanno et al. | |
| 6,471,584 B1 | 10/2002 | Wada et al. | |
| 6,471,586 B1 | 10/2002 | Aiki et al. | |
| 6,475,083 B1 | 11/2002 | Comez et al. | |
| 6,543,769 B1 | 4/2003 | Podoloff et al. | |
| 6,545,661 B1 | 4/2003 | Goschy et al. | |
| 6,597,342 B1 | 7/2003 | Haruta | |
| 6,624,802 B1 * | 9/2003 | Klein et al. | 345/156 |
| 6,634,947 B1 | 10/2003 | Miyamoto et al. | |
| 6,739,974 B2 | 5/2004 | Kanno et al. | |
| 6,836,329 B1 | 12/2004 | Ziemins et al. | |
| 6,908,386 B2 | 6/2005 | Suzuki et al. | |
| 7,169,998 B2 | 1/2007 | Kondo et al. | |
| 7,223,173 B2 | 5/2007 | Masuyama et al. | |
| 7,379,841 B2 | 5/2008 | Ohta | |
| 2002/0180166 A1 | 12/2002 | Voss | |
| 2005/0076161 A1 | 4/2005 | Albanna et al. | |
| 2005/0119036 A1 | 6/2005 | Albanna et al. | |
| 2006/0019753 A1 | 1/2006 | Ohta | |
| 2006/0052165 A1 | 3/2006 | Ohta | |
| 2006/0091310 A1 | 5/2006 | Furry | |
| 2006/0183546 A1 | 8/2006 | Addington et al. | |
| 2006/0258458 A1 | 11/2006 | Addington et al. | |
| 2006/0281549 A1 | 12/2006 | Iwamoto et al. | |
| 2006/0287089 A1 | 12/2006 | Addington et al. | |
| 2007/0049374 A1 | 3/2007 | Ikeda et al. | |
| 2007/0050597 A1 | 3/2007 | Ikeda | |
| 2007/0060391 A1 | 3/2007 | Ikeda et al. | |
| 2007/0072680 A1 | 3/2007 | Ikeda | |
| 2007/0155495 A1 | 7/2007 | Goo | |
| 2007/0211025 A1 | 9/2007 | Sato | |
| 2007/0213127 A1 | 9/2007 | Sato | |
| 2007/0243931 A1 | 10/2007 | Ohta et al. | |
| 2007/0265084 A1 | 11/2007 | Sato et al. | |
| 2007/0265085 A1 | 11/2007 | Miyamoto et al. | |
| 2008/0015017 A1 | 1/2008 | Ashida et al. | |
| 2008/0064109 A1 | 3/2008 | Okamura | |
| 2008/0064498 A1 | 3/2008 | Okamura | |
| 2008/0084385 A1 | 4/2008 | Ranta et al. | |
| 2008/0102962 A1 | 5/2008 | Pease et al. | |
| 2008/0214305 A1 | 9/2008 | Addington et al. | |
| 2009/0227426 A1 | 9/2009 | Dubar | |
| 2010/0009762 A1 * | 1/2010 | Takeda et al. | 463/47 |
| 2010/0107958 A1 | 5/2010 | Rhodes et al. | |
| 2010/0238041 A1 | 9/2010 | Acedo et al. | |
| 2011/0124387 A1 * | 5/2011 | Sauerbrei et al. | 463/7 |

OTHER PUBLICATIONS

Written Opinion on corresponding PCT application (PCT/US2010/024873) from International Searching Authority (KR) dated Oct. 15, 2010.
Internet Home page. members.surfbest.net/surfwave@surfbest.net. Printed Jun. 11, 2008 (1 sheet).
The Interactive Surfboard TV Game. Hammacher Schlemmer Online Catalogue. www.hammacher.com/publish/74324.asp. Printed Jun. 11, 2008 (1 sheet).
Miller, Chuck. "Console Specialty Controller Roundup." Dec. 4, 2007 Gamespy.com. archive.gamespy.com/hardware/december02/consolespecial/. p. 1. Printed Apr. 14, 2009 (3 sheets).
Miller, Chuck. "Console Specialty Controller Roundup." Dec. 4, 2007 Gamespy.com. archive.gamespy.com/hardware/december02/consolespecial/. p. 2. Printed Apr. 14, 2009 (4 sheets).
Miller, Chuck. "Console Specialty Controller Roundup." Dec. 4, 2007 Gamespy.com. archive.gamespy.com/hardware/december02/consolespecial/. p. 3. Printed Apr. 14, 2009 (3 sheets).
Miller, Chuck. "Console Specialty Controller Roundup." Dec. 4, 2007 Gamespy.com. archive.gamespy.com/hardware/december02/consolespecial/. p. 4. Printed Apr. 14, 2009 (3 sheets).
Senario Silver Surfer Stand on Game. Target. www.target.com/Senario-Silver-Surfer-Stand-Game/dp/B000RWEF2k. Printed Apr. 14, 2009 (3 sheets).
Knight; "Amiga Joyboard." www.amigahistory.co.uk/joyboard.html Printed Apr. 22, 2009 (2 sheets).
Atariage. "Mogul Maniac." www.atariage.com/manual_html_page.html?SoftwareLabelID=309 Printed Apr. 22, 2009 (3 sheets).
U.S. Appl. No. 12/675,446, filed Nov. 24, 2009, Sauerbrei et al., Office Action, Feb. 26, 2013.

\* cited by examiner

VIDEO GAME AND PERIPHERAL FOR SAME

BACKGROUND OF THE INVENTION

The present invention generally relates to video games, and more particularly to a video game and a peripheral for a video game.

Video games provide fun and enjoyment for many. Video games allow game players to participate in a variety of simulated activities, including those that the game players may not be able or desire to experience directly, whether due to cost, danger, or equipment concerns, or simply due to inadequate time or ability to obtain sufficient proficiency in an activity.

Video games often include video game hand-held controllers which game players manipulate as part of game play. The controllers often include a variety of input devices, such as digital buttons and analog sticks, which allow game players to provide a variety of input commands for game play. The controllers are useful in that they allow game players to play a variety of video games all making use of the same controller.

The use of a generic controller, however, may detract from enjoyment of an overall simulated environment. Unfortunately, video game developers must often support a controller associated with a specific video game console, and the video game console itself may be particularly configured for communications from or with the controller. Moreover, real world items may be unsuitable for adaptation for use in a video game environment.

BRIEF SUMMARY OF THE INVENTION

The invention provides a video game and a peripheral for a video game. In one aspect the invention provides a peripheral for a video game, comprising: a housing including at least one surface providing a deck; a position related sensing device fixedly coupled to the housing to providing housing position related information; at least one proximity sensor to provide object detection information of objects proximate to the housing; and a transmitter to transmit information of the position related sensing device and information of the at least one proximity sensor.

Another aspect of the invention provides a video game system comprising: a video game controller in the form of a housing with an elongate upper surface having a substantially flat portion for standing thereupon, the housing housing a position related sensing device, an object proximity sensing device, a signal transmitter, and circuitry coupling the position related sensing device and the object proximity sensing device with the signal transmitter; and a video game console including a processor configured by program instructions to determine a steering direction of a video game object based on signals including information of the position related sensing device received from the video game controller, to modify a game state based on signals including information of the object proximity sensing device received from the video game controller, and to generate video game display information based on the steering direction and the game state.

These and other aspects of the invention are more fully comprehended upon review of this disclosure.

DETAILED DESCRIPTION

Figure 1:
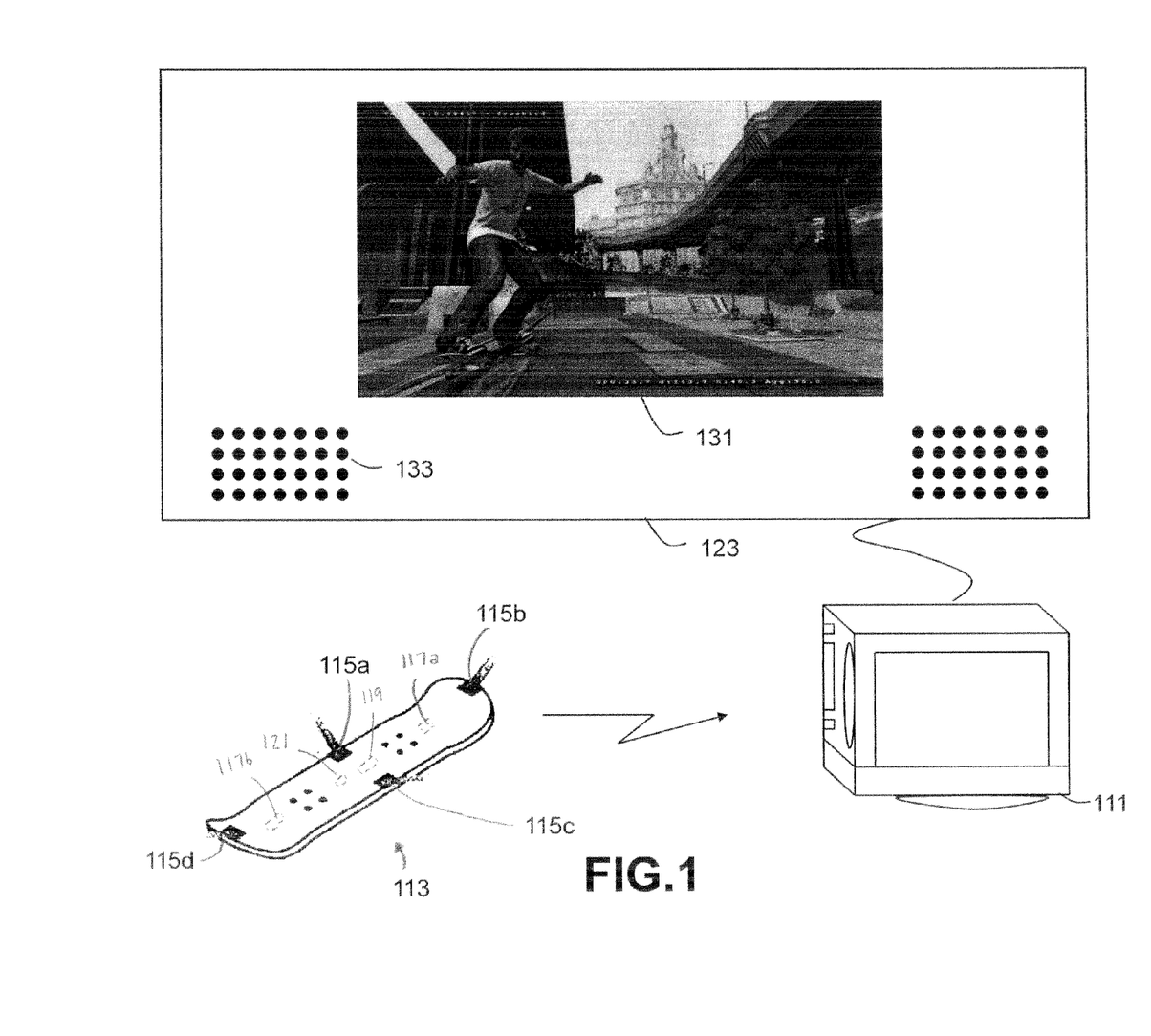
FIG. 1 is an example of a video game system in accordance with aspects of the invention.

FIG. 1 is an example of a video game system in accordance with aspects of the invention. The video game system includes a video game console 111, a display 123, and a video game controller 113 with a board-like upper surface. The video game console includes circuitry which allows the console to run a video game by executing various program instructions related to execution of the video game. The video game console typically includes one or more processors, memory, and various interface circuitry for running the video game. The instructions for specific video game are generally found on a removable memory source, for example such as a DVD-ROM, BD-ROM, or CD-ROM, inserted into a removable memory interface of the video game console. In many embodiments the removable memory source is in the form of optical media and the removable memory interface is in the form of an optical disk drive. In some embodiments of the invention, the video game console may be a handheld gaming device, including similar internal circuitry as herein described, as well as, for example, a built in display or displays and various different user input devices, and in some embodiments a personal computer or the like may be used instead of a video game console.

The video game console communicates with or receives communications from the video game controller. The video game controller in the embodiment of FIG. 1 includes a housing with an upper surface generally in the form of a deck of a skateboard, and may be considered a board peripheral for a video game. As illustrated in FIG. 1, the deck is a surface of substantially a longitudinal board and includes a flat central portion with upturned portions with rounded edges at opposing longitudinal ends of the board. The central portion, as shown, is flat, as opposed to decks of actual skateboards, which are generally somewhat concave latitudinally.

In the embodiment of FIG. 1 the housing of the board peripheral contains a processor 119. The processor processes signals derived from at least one position related sensor device, with two position related sensors 117a,b indicated in FIG. 1. The processor also processes signals derived from proximity sensors 115a-d. also contained in the housing. In many embodiments the position related sensing device is an accelerometer, and in many embodiments two accelerometers are used. The processor provides information to a wireless transmitter 121, which may be part of a wireless transceiver, and the transmitter transmits information, which may be considered user input signals, to the video game console. In some embodiments, however, communication from the board peripheral and the video game console, or between the two of them, may be accomplished using wired communications.

The accelerometers, preferably three-axis accelerometers, provide signals indicative of acceleration of the board, and from which position of the board may be determined. In some embodiments a geomagnetic sensor may instead or additionally be used. The proximity sensors, shown as near a front of the board, a rear of the board, and on opposing sides approximate the center of the board, sense items, such as a game player's hands or legs, approximate the sensors. The sensors are somewhat aimed or directed away from the body and in many embodiments are directed to detect items outside a vertical column, the sides of which are defined by edges of the board. Preferably the proximity sensors are sonar sensors or ultrasonic sensors, although other sensors, for example infrared sensors, may be used in some embodiments. Thus, for example, the ultrasonic sensors may sense when a game player grabs the front or the rear of the board, or, depending on sensitivity of the ultrasonic sensors, when the game player places a hand near the front or the rear of the board.

The video game console is also in communication with the display unit 123, either through an audio-video cable or similar wired connection or by way of wireless communications. The display unit is typically a television, with a display screen 131 and at least one audio output device, such as a speaker 133. In the embodiment of FIG. 1, the display screen shows a screen shot of a video game play of a skateboarding video game. As illustrated, the screen shot shows a rear view of a skateboard ridden by a skateboarder.

Generally, a game player of the video game system operates the board shaped peripheral to cause the board shaped peripheral to generate user input signals, which are sent to the video game console. The video game console uses the user input signals to determine a game state. For example, in embodiments in which the video game console executes a skateboarding video game, the video game console may use the user input signals to determine a turn made by a skateboarder, to determine a hand grab by the skateboarder, or some other game state. The video game console provides signals of a display for the game state to the display unit, and a game player may see results of operation of the board peripheral.

Figure 2:
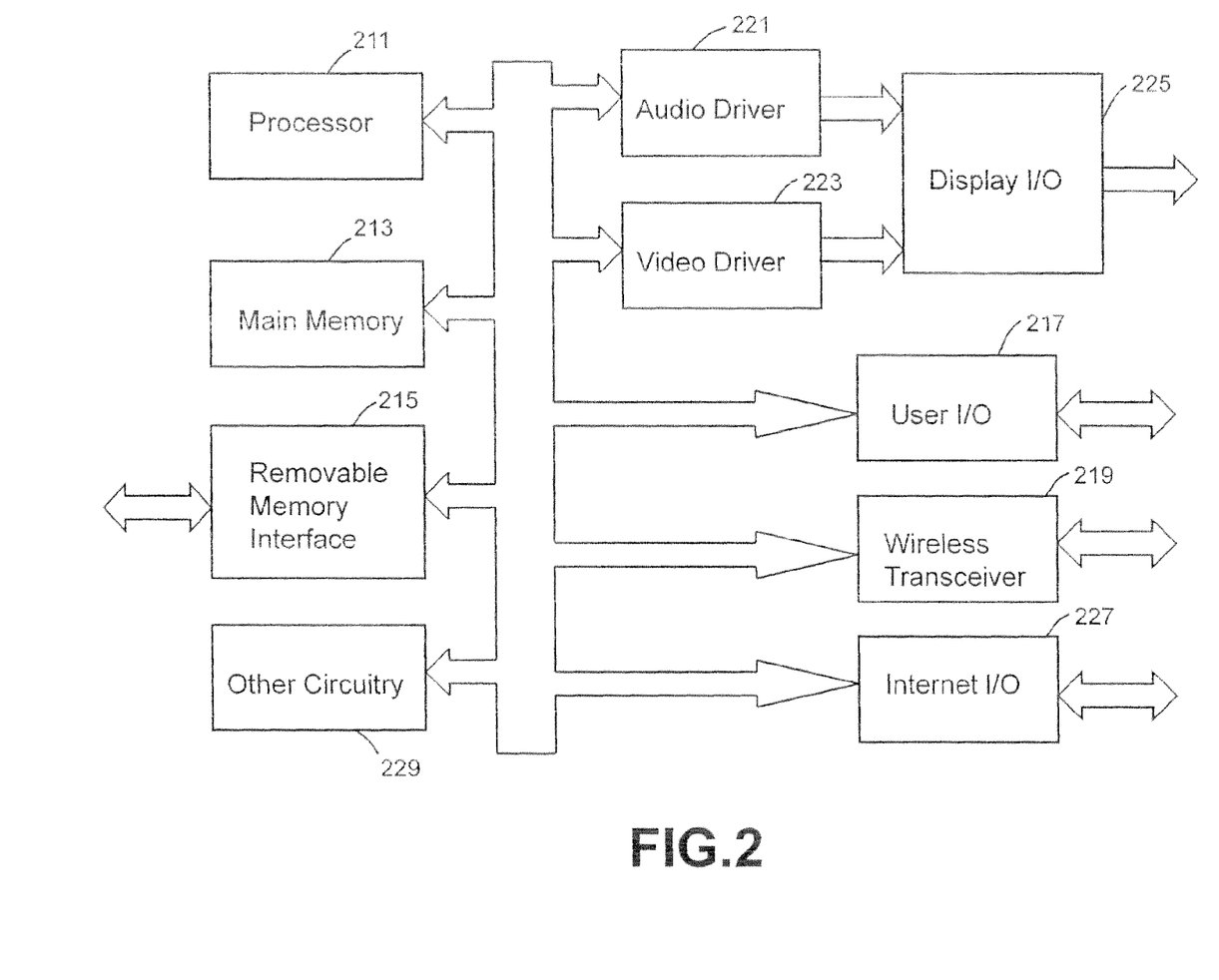
FIG. 2 is an example of a block diagram of a video game console processing unit in accordance with aspects of the invention.

FIG. 2 is an example of a block diagram of a video game console processing unit in accordance with aspects of the invention. In the embodiment of FIG. 2, the processing unit includes at least one processor 211 interconnected with other components via a system bus. The other components may include, for example, a main memory 213 of the video game console, a removable memory interface 215, a user input/output port 217, a wireless transceiver 219, an audio driver 221, a video driver 223, both in communication with a display I/O port, an Internet input/output port 227, and other circuitry 229, which may include for example an infrared sensor. In other embodiments of the invention, there may be different combinations of components that make up a video game console processing unit.

The processor executes various types of software instructions to facilitate video game play of, for example, a skateboard based video game described with respect to FIG. 1. The processor may use the components of the processing unit in order to execute the software instructions. The processor may retrieve video game instructions for a specific video game from a removable memory source, for example a DVD-ROM, inserted into the removable memory interface of the video game console. The processor may process the video game instructions in accordance with console specific program instructions, which are generally found in the main memory of the video game console. The processor also receives user input signals from a connected video game controller, either through the user input/output port or the wireless transceiver. The processor processes the various instructions and received input signals to generate audio and video output signals representative of video game play.

The processor may also be in data communication with a display unit, which outputs audio and video outputs of video game action to a user of the system. The processor may send audio generation information to the audio driver, and video generation information to the video driver, each of which generates audio and video output signals, respectively, from the received generation information. The audio and video drivers forward the audio and video output signals through a combined display input/output port 225, or alternatively, separate audio and video input/output ports, to the display unit.

In some embodiments, the processor is also connected to the Internet via either the Internet input/output port, or via the wireless transceiver. A connection to the Internet may be used to facilitate multiplayer game play with other users in remote locations if a multiplayer option is provided by a particular video game. In some embodiments, an Internet connection may also be used by video game companies to offer, for free or for sale, downloadable content associated with a particular game.

Figure 3:
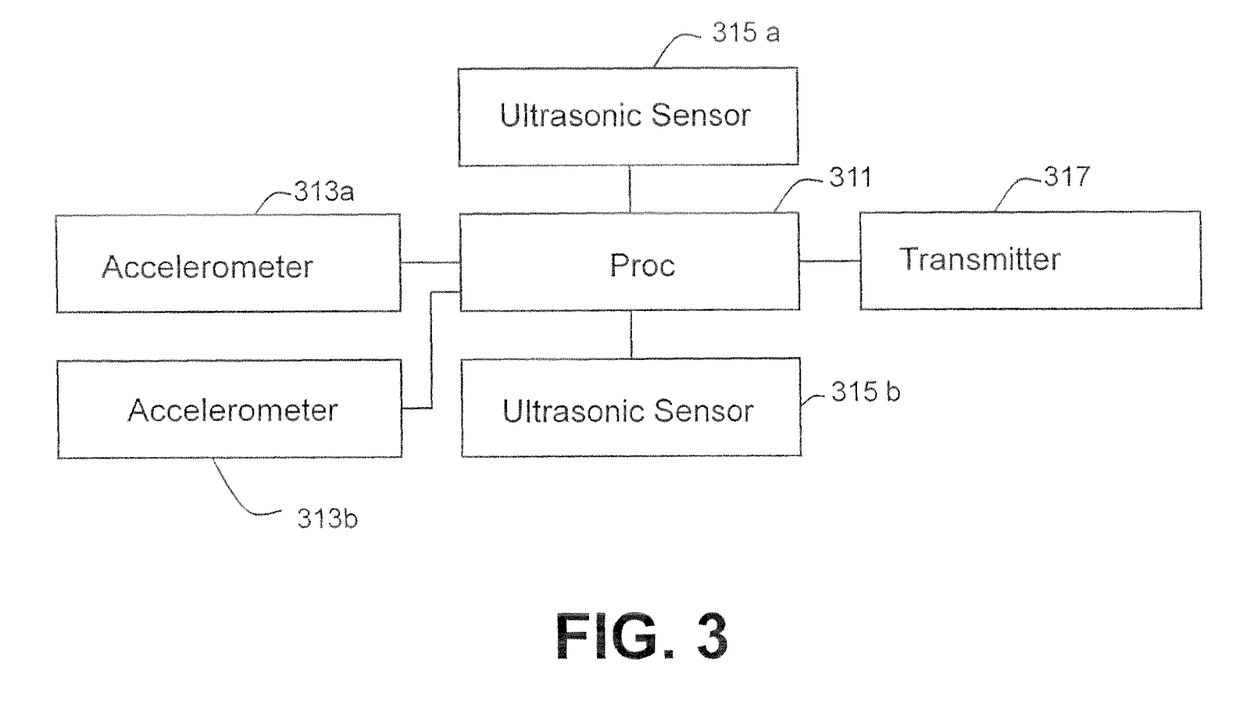
FIG. 3 is an example block diagram of circuitry of a board peripheral in accordance with aspects of the invention.

FIG. 3 is a block diagram of circuitry of an embodiment of a board peripheral. The circuitry includes a processor 311. In various embodiments the processor may be a microprocessor, a digital signal processor (DSP), an application specific integrated circuit (ASIC), or a programmable device. The processor receives data from a first accelerometer 313a and a second accelerometer 313b. In various embodiments, however, more or less than two accelerometers are used. As illustrated in FIG. 3, the processor also receives data from two proximity sensors, shown as ultrasonic sensors 315a,b. In many embodiments, however, and as shown in FIG. 1, four or some other number of proximity sensors are used. The processor provides information of the received data to a transmitter 317, which is preferably a wireless transmitter.

In some embodiments the processor determines board position information using data from the accelerometer, and causes transmission of the board position information by way of the wireless transmitter. In other embodiments the processor packages data of the accelerometer for a format appropriate communications with a video game console, and the video game console determines board position information. In addition, in some embodiments a magnetic sensor is also used to provide position related information, it having been found that use of a magnetic sensor, or additional use of a magnetic sensor, is beneficial in more accurately determining board position.

In most embodiments the processor determines if information from the ultrasonic sensors indicates that a game player's hand is within a predefined distance of a particular sensor, indicating a grab or attempted grab of the board peripheral, or, in some embodiments, indicating a kick motion to propel the board, and causes transmission of grab status or kick status by way of the wireless transmitter. In some embodiments the processor instead causes transmission of a value indicative of a strength of a return signal to a sensor, on a sensor by sensor basis.

Figure 4:
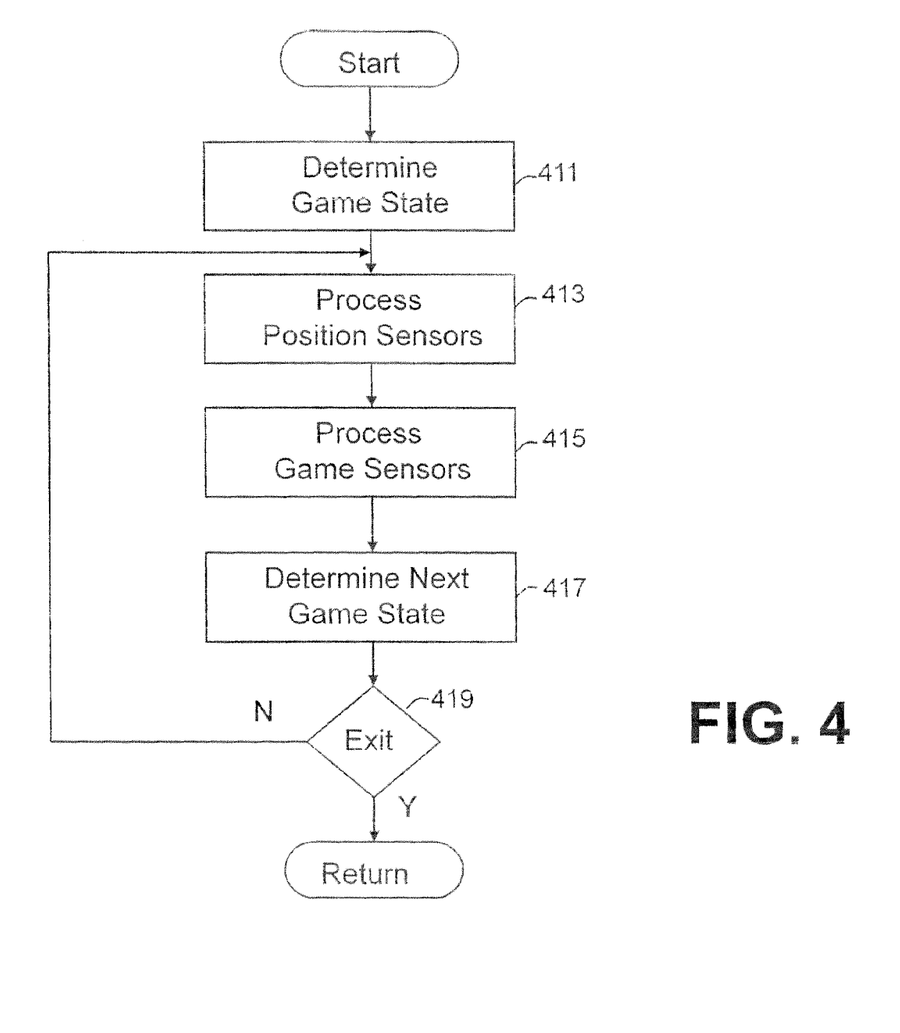
FIG. 4 is a flow diagram of a video game process in accordance with aspects of the invention.

FIG. 4 is a flow diagram of a process of a video game in accordance with aspects of the invention. In some embodiment the process is performed by a video game console or a processor, for example of a video game console. In some embodiments portions of the processing may be performed by a processor of a peripheral or controller associated with a video game console.

In block 411 the process determines a game state of a video game. The game state may include state information for a plurality of video game entities. For example, for a skateboarding video game the game state may include information for position of a skateboard and a skateboarder in a simulated world, and possibly information of skating status (direction of travel, change in direction of travel, skating, bailed, etc.), point accumulation status, and other information. In most embodiments game state information is based on a prior game state adjusted for changes that occur with respect to time and user input signals received, for example, from a board peripheral. Generally, the process also forms display information indicative of the game state, and provides the display information to a display device for display and presentation to a game player.

In block 413 the process processes position related sensor information. For example, for a skateboarding video game, the process may receive accelerometer or accelerometer derived information, and process the information to determine a position of a peripheral with a board-like surface, or relative movement of the peripheral. In general, the process processes the information to determine pitch, roll and yaw of the peripheral, although in some embodiments the process may also or instead determine translation of the peripheral. In many instances the process processes the information using classical physics equations, for example using program instructions implementing a physics engine, to determine position of the peripheral, with the information for example indicative of acceleration of the peripheral or locations within the peripheral. In some embodiments the process may in addition or instead receive geomagnetic sensor derived information to use in determining a position of the peripheral with a board-like surface.

In block 415 the process processes other game sensor information. In most embodiments the other game sensor information includes information from at least one proximity sensor. The proximity sensor, in some embodiments, is an ultrasonic sensor. For example, for a skateboarding video game, the process may receive ultrasonic sensor derived information, and process the information to determine if a game player's hand has grabbed or is approximate a forward or rearward edge of a peripheral with a board-like surface. Alternatively, or in addition, the process may process the information to determine that a game player has made a kick motion about a side of the peripheral. In some embodiments, for example using multiple proximity sensors, the proximity sensors or groups of proximity sensors may be triggered and/or sampled at different times. For example, for a peripheral with proximity sensor about a front, rear, left side, and right side of a board-like surface, front and rear proximity sensors may be triggered at a first time and left and right proximity sensors may be triggered at a second time, with the triggering sequence then repeated multiple times. Triggering of different proximity sensors or groups of proximity sensors may be beneficial, for example, in reducing interference or cross-talk between different proximity sensors.

In block 417 the process determines a next game state of the video game. The next game state includes state information for the plurality of video game entities, and in most embodiments is based on the prior game state adjusted for changes that occur with respect to time and position and/or relative movement of the peripheral and whether a grab of the peripheral has been performed or attempted. For example, in a skateboarding video game, the process may determine that a game player has tilted the peripheral along a longitudinal axis to effect a turn, rotated the board along the longitudinal axis to effect an Ollie, or grabbed the board. Generally, the process also forms display information indicative of the game state and provides the display information to a display device for display and presentation to the game player.

In block 419 the process determines whether to exit. The process may exit, for example, if a game player has bailed, or if the process is otherwise commanded to exit. If the process does not exit, the process goes to block 413, otherwise the process returns.

Figure 5:
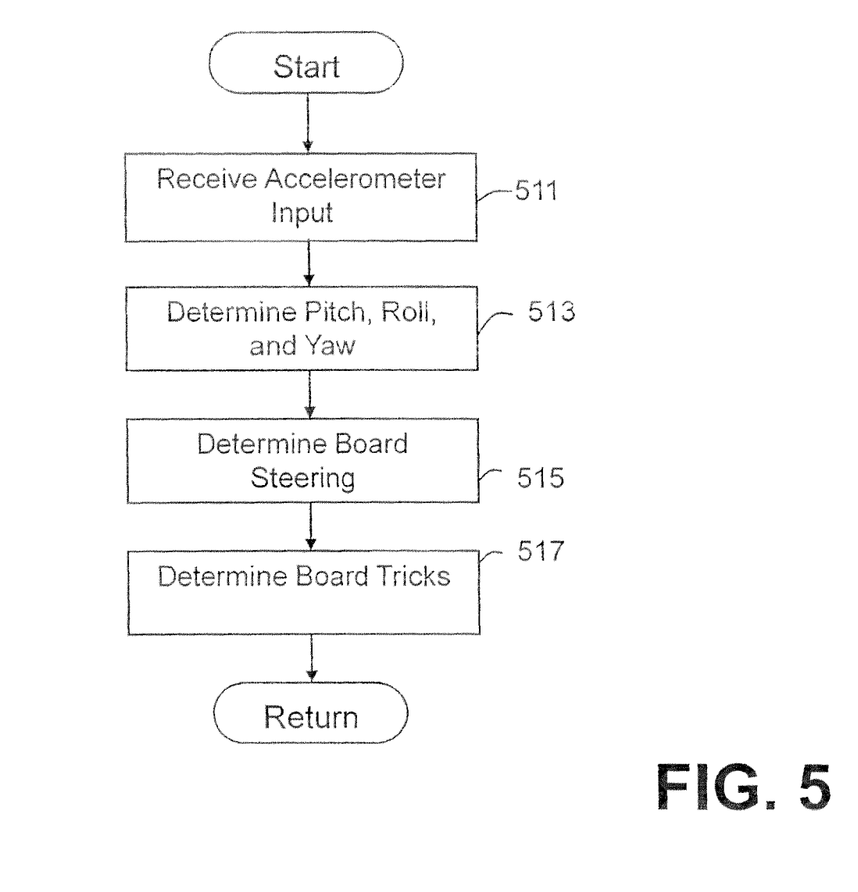
FIG. 5 is a flow diagram of a process for processing position related information in accordance with aspects of the invention.

FIG. 5 is flow diagram of an embodiment of a process for processing peripheral position related information in accordance with aspects of the invention. The process may be performed, for example, by a video game console or a processor of a video game console.

In block 511 the process receives accelerometer sensor inputs. The accelerometer sensor inputs may be provided, for example, by one or more accelerometers in a peripheral for a video game. The peripheral may be for a skateboard game, and include an elongate top surface similar to a deck of a skateboard. The accelerometer is preferably a three-axis accelerometer, although in some embodiments single axis or two-axis accelerometers may be used. In block 513 the process determines pitch, roll, and yaw angles for the peripheral. The process determines the pitch and roll angles using the accelerometer sensor inputs.

In block 515 the process determines a peripheral steering direction. The peripheral steering direction in some embodiments is a function of peripheral roll angle and peripheral yaw angle. For example, in some embodiments the yaw angle provides a pointing direction of the peripheral, and the roll angle provides an offset to the pointing direction, such as may be provided by eccentrically loaded wheels and trucks of a skateboard.

In block 517 the process determines if a trick sequence has been accomplished using the peripheral. For example, in a skateboard video game an Ollie may be accomplished, in some embodiments, by first elevating a front of the peripheral and then elevating a rear of the peripheral. Accordingly, the process determines if a sequence of movements of the peripheral indicates performance of a trick. The process does so, in some embodiments, by storing position data of the peripheral over a period of time, and comparing the stored position data to predefined sequences indicative of performance of a trick.

The process thereafter returns.

Figure 6:
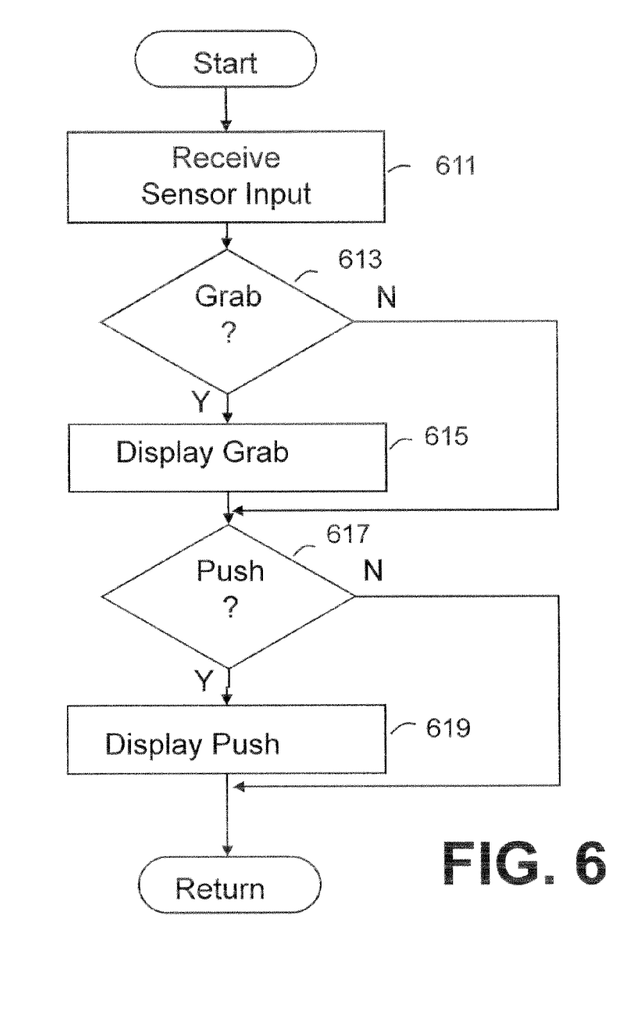
FIG. 6 is a flow diagram of a process for processing proximity sensor inputs in accordance with aspects of the invention.

FIG. 6 is a flow diagram of a process for processing proximity sensor inputs in accordance with aspects of the invention. In some embodiments the process is performed by a video game console or a processor of a video game console, or possibly also in part by processing circuitry of a peripheral, and in some embodiments the proximity sensors are ultrasonic sensors.

In block 611 the process receives sensor inputs. The sensor inputs indicate presence of an object within a defined range of the sensor, with the range depending on the particular sensor, mounting of the sensor, and related considerations. In some embodiments, and as discussed in the example process of FIG. 6, the sensor inputs include inputs from a front sensor proximate a front of a peripheral, a rear sensor proximate a rear of the peripheral, a left sensor along a left side and proximate a midpoint of the peripheral, and a right sensor along a right side and proximate the midpoint of the peripheral.

In block 613 the process determines if a grab has been performed. In some embodiments the process determines that a grab has been performed if the input from the front sensor or the rear sensor is greater than a predefined magnitude. In some embodiments the process also determines if a grab has been performed if the input from the left sensor or the right sensor is greater than a predefined magnitude. If a grab has been performed, the process in block 615 commands display of a grab. For example, if the process determines the front sensor indicates a grab, the process commands a display for example showing a forward hand of a skateboarder grabbing a front of a skateboard. Alternatively, if the process determines the rear sensor indicates a grab, the process commands a display for example showing a rear hand of a skateboarder grabbing a rear of the skateboard.

In block 617 the process determines if a push, or a kick, has been performed. In some embodiments the process determines that a push has been performed if the input from the left or right sensor is greater than a predefined magnitude, or, in some embodiments, within a predefined range of magnitude, or, alternatively, by determining a direction of motion of an object based on sensor input. If a push has been performed, the process in block 619 commands display of push, with the display for example showing a foot of a skateboarder pushing against the ground in a kicking motion. The process thereafter returns.

Figure 7:
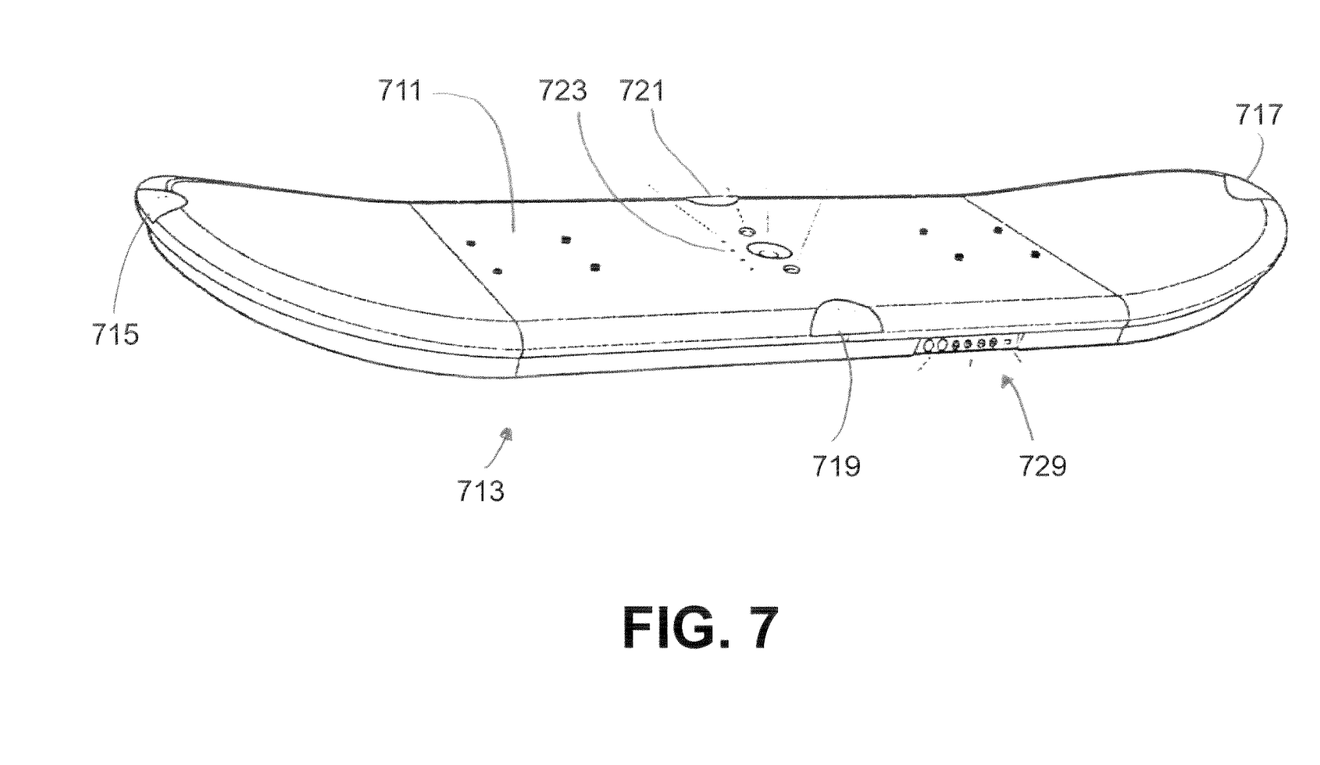
FIG. 7 shows a board peripheral in accordance with aspects of the invention.

FIG. 7 is a perspective view of a peripheral in accordance with aspects of the invention. The peripheral serves as a video game controller. The video game controller is a generally in the shape of a deck of a skateboard, although in many embodiments the video game controller is somewhat shorter in longitudinal length than many skateboards, and the video game controller may have a length, for example, of 28 inches. The video game controller includes an upper surface 711 and a lower surface 713 coupled by sidewalls. The video game controller includes electronic circuitry, for example, circuitry as discussed with respect to FIG. 3. The upper surface includes a flat central portion longitudinally bounded by slightly upturned ends. Four proximity sensors, in most embodiments sonic sensors, occupy cutouts in edges of the deck, with a front proximity sensor 715 at a forward edge of the deck, a rear proximity sensor 717 at a rear edge of the deck, a left proximity sensor 717 at a midpoint of a left side of the deck, and a right proximity sensor 719 at a midpoint of a right side of the deck. As illustrated in FIG. 7, covers are provided for the sensors, with the covers generally increasing smoothness of surface transition for the surface of the peripheral.

In some embodiments a linear array of lights 723, for example provided by light emitting diodes (LEDs), may be provided slightly forward of a midpoint of the flat central portion of upper surface. The lights may, for example, be used to indicate status of the peripheral or of a game console in communication with the peripheral. In operation feet of a game player are generally located about forward and rear portions of the flat central portion of the deck, and therefore the game player may be able to see the lights while standing on the board. The left side surface additionally includes buttons 729. The buttons may be used to turn on the peripheral or to provide input commands to a video game console in data communication with the peripheral. For example, in some embodiments the buttons may be electronically coupled to, for example, a processor of the video game controller, with the processor providing status of state of the buttons to a game console by way of a wireless transmitter.

In some embodiments a cutout may provided in the upper surface, for example in the flat central portion, with the cutout configured to receive a face plate. The face plate may, for example, be used to provide a textured surface for standing upon, or may be used to allow personalization of the peripheral through the use of graphics, logos, or colors or other indicia on the face plate. The face plate may be adhered within the cutout using adhesives or hardware mounting items, for example a screw or bolt coupled to a threaded hole in the peripheral. In many such embodiments the face plate may have a width such that the face plate maintains a flat surface across the flat upper surface of the peripheral.

Figure 8:
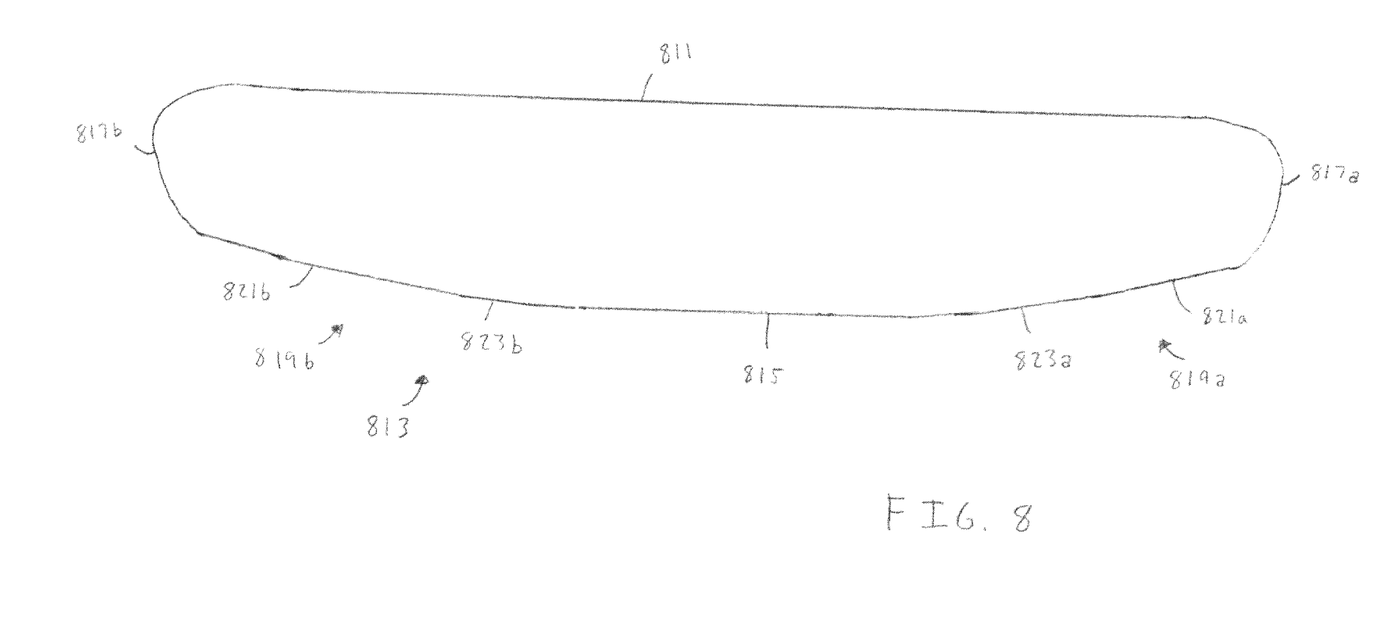
FIG. 8 shows a cross-sectional of a board peripheral in accordance with aspects of the invention.
Figure 9:
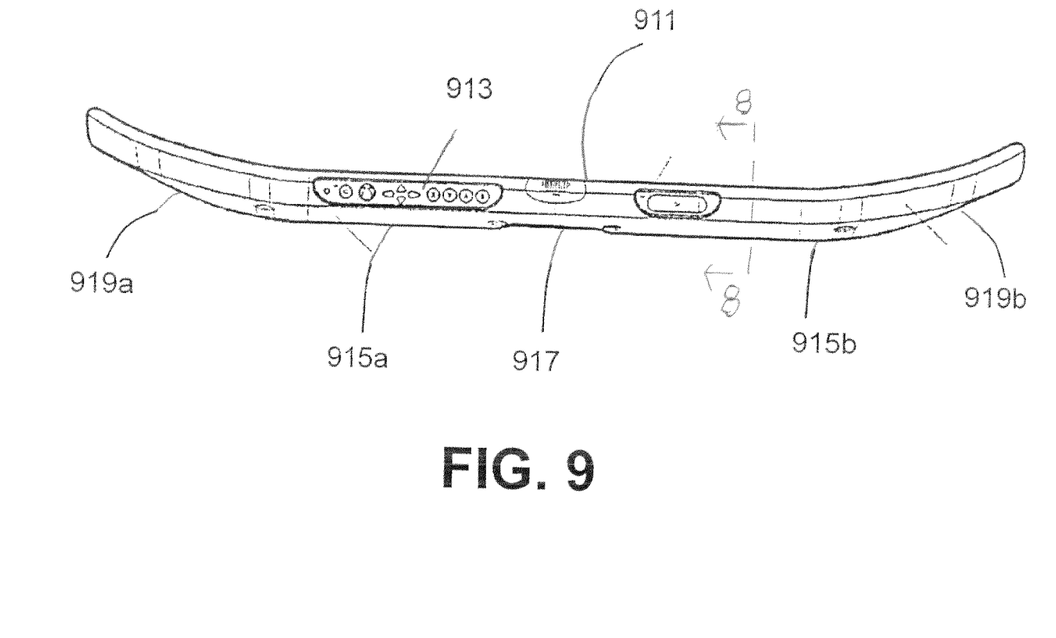
FIG. 9 shows a side view of a board peripheral in accordance with aspects of the invention.

FIG. 8 illustrates a latitudinal cross-section of an embodiment of a board peripheral, for example the board peripheral of FIG. 1, in accordance with aspects of the invention. The cross-section may also be across a width of a board peripheral as indicated in FIG. 9, with the cross-section of FIG. 8 intended to only provide details of external surface shape of an example board peripheral. The board peripheral is formed of a housing with an upper surface 811 forming a deck. In the embodiment of FIG. 8 the upper surface provides a flat surface. A flat surface, as opposed to for example a concave surface as may be found in skateboards, may be beneficial in providing a stable surface for standing by different individuals regardless of foot size. A somewhat arcuate lower surface 813 couples opposing longitudinal edges of the upper surface. The somewhat arcuate lower surface includes a central bottom portion 815. In some embodiments, and as illustrated in FIG. 8, the central bottom portion is flat and parallel to the upper surface. In some embodiments the central bottom surface has a width of three inches, it having been found that a width of three inches for the central bottom surface may be preferable. Opposing side walls 817*a,b* and opposing inwardly angled edges 819*a,b* of the somewhat arcuate lower surface couple the central bottom portion and the upper surface. The opposing side walls extend from chamfered longitudinal edges of the upper surface. The inwardly angled edges, extend downward from the side walls to the central bottom portion. In some embodiments the inwardly angled edges each include two portions, a first flat portion 821*a,b* approximate a one of the side walls and a second flat portion 823*a,b* approximate the central bottom portion. In some embodiments the first flat portion defines a line with an angle of 16 degrees with respect to a line defined by the flat central bottom portion, and the second flat portion defines a line with an angle of 8 degrees with respect to a line defined by the flat central bottom portion, with such a configuration possibly providing for increased ease of use in tilting or rolling the board peripheral. In addition, as illustrated, transitions between the first flat portion, the second flat portion, and the central bottom portion are rounded so as to avoid abrupt transitions in the surface of the board-like peripheral.

In some embodiments the board peripheral may have the cross-section of FIG. 8 continuous along the board, although generally with a width tapering about ends of the board. In other embodiments the board peripheral may have the cross-section of FIG. 8 in a main central area of the board, with possibly a different cross-section in upturned edges about opposing longitudinal ends of the main central area. In still other embodiments, for example the embodiment of FIG. 9, the board peripheral may have the cross-section of FIG. 8 substantially in a main central area of the board, with a widthwise channel interposed about a center of the board. In addition, in some embodiments the lower surface is formed of slick plastic to increase ease of motion of the board peripheral on, for example, or rug or other floor covering. In some embodiments a self-lubricating plastic is used for the lower surface. In other embodiments a polished polymeric composition is used for the lower surface.

FIG. 9 illustrates a side view of a board peripheral in accordance with the aspects of the invention. The board peripheral includes an upper surface 911 with a substantially flat center portion and upturned opposing ends. A sidewall includes buttons 913. A lower surface is coupled to the upper surface by the sidewall. The lower surface includes a forward pad 915a and a rearward pad 915b, with the forward pad and the rearward pad including substantially flat bottom surfaces parallel to the flat center portion of the upper surface. The forward pad and the rearward pad are separated by a channel 917. In some embodiments the channel separates the forward pad and rearward pad by 3 inches. Forward of the forward pad the lower surface includes a forward upturned end 919a and rearward of the rearward pad the lower surface includes a rearward upturned end 919b.

The forward pad is substantially underneath a forward part of the flat center portion of the upper surface and the rearward pad is substantially underneath a rearward part of the flat center portion of the upper surface. During use a game player's feet will generally be located about the forward part of the flat center portion and the rearward portion of the flat center portion, and generally the forward pad and the rearward pad will transfer the game player's weight to and maintain contact with a floor, maintaining the board in a generally longitudinally horizontal position. During use, however, a game player may place one or more feet on one of the upturned opposing ends of the upper surface, transfer weight to that upturned end, and thereby longitudinally tilt the peripheral. In some embodiments a bottom surface of the upturned opposing ends defines, in longitudinal cross-section, an angle of 25 degrees with bottom surfaces of the pads.

Accordingly, the invention provides for a video game and a board peripheral. Although the invention has been described with respect to certain specific embodiments, it should be recognized that the invention comprises the novel and unobvious claims supported by this disclosure, along with their insubstantial variations.

The invention claimed is:

1. A peripheral for a video game, comprising:
a housing including at least one surface providing a deck;
at least one position related sensing device fixedly coupled to the housing to provide housing position related information;
at least two proximity sensors, directed to detect objects outside a vertical column defined by edges of the deck, to provide object detection infoimation of objects proximate to the housing, said detection information including information regarding proximity of and position of said objects relative to the housing; and
a transmitter to transmit information of the position related sensing device and information of the at least two proximity sensors.

2. The peripheral of claim 1 wherein at least one of the proximity sensors is a sonic detector.

3. The peripheral of claim 1 wherein the deck is substantially in the shape of a deck of a skateboard.

4. The peripheral of claim 1 wherein at least one of the at least one position related sensing device comprises a three-axis accelerometer.

5. The peripheral of claim 1 wherein the position related sensing device and proximity sensors are within the housing.

6. The peripheral of claim 5 further comprising a processor housed within the housing, the processor coupled to the accelerometer and the at least one proximity sensor so as to receive information from the accelerometer and the at least one proximity sensor, the processor additionally coupled to the transmitter, the processor configured to provide the transmitter the information of the accelerometer and the at least one proximity sensor.

7. The peripheral of claim 1 wherein the at least one position sensing device comprises two accelerometers.

8. The peripheral of claim 7 wherein each of the two accelerometers comprise three-axis accelerometers.

9. The peripheral of claim 1 wherein the housing including at least one surface providing the deck includes a lower surface of generally somewhat arcuate cross-section, the lower surface coupling opposing longitudinal edges of the at least one surface providing the deck, the lower surface including a longitudinal flat central portion, the longitudinal flat central portion forming a surface parallel to the at least one surface providing the deck.

10. The peripheral of claim 9 wherein the longitudinal flat central portion has a width of approximately 3 inches.

11. The peripheral of claim 9 wherein the lower surface includes surfaces providing in cross-section opposing inwardly angled edges, the opposing inwardly angled edges each including two portions, each of the two portions defining a line at differing angles with respect to a line defined by the flat central portion.

12. The peripheral of claim 1 wherein the housing including at least one surface providing the deck includes sidewalls extending down from the at least one surface, with buttons present on at least one of the sidewalls, the buttons for providing input information for transmission by the transmitter.

13. A video game system comprising:
a video game controller in the form of a housing with an elongate upper surface having a substantially flat portion for standing thereupon, the housing housing a position related sensing device providing housing position related information, an object proximity sensing device, directed to detect objects outside a vertical column defined by edges of the housing, providing information regarding object proximity and position relative to the housing, a signal transmitter, and circuitry coupling the position related sensing device and the object proximity sensing device with the signal transmitter;
a video game console including a processor configured by program instructions to determine movement in each directional axis of a video game object based on signals including information of the position related sensing device received from the video game controller and information of the object proximity sensing device received from the video game controller, and to generate video game display information based on the movement information.

14. The video game system of claim 13 wherein the video game object is a skateboard.

15. The video game system of claim 13 wherein the position related sensing device comprises at least one accelerometer.

16. The video game system of claim 13 wherein the object proximity sensing device comprises an ultrasonic sensor.

17. The video game system of claim 13 wherein the circuitry includes a processor.

* * * * *